United States Patent [19]

Evans

[11] 3,889,702
[45] June 17, 1975

[54] PROCESS FOR REDUCING FRICTION LOSS IN FLOWING ORGANIC FLUIDS

[75] Inventor: Allan P. Evans, Annapolis, Md.

[73] Assignee: The United States of America as represented by the Secretary of the Navy, Washington, D.C.

[22] Filed: Jan. 23, 1974

[21] Appl. No.: 435,809

[52] U.S. Cl. ............................ 137/13; 260/429.7
[51] Int. Cl. ................................................ F17d 1/16
[58] Field of Search ................. 260/429.7; 137/13

[56] References Cited
UNITED STATES PATENTS 3,520,313  7/1970  Seymour ............................ 137/13
3,757,864  9/1973  Crawford ........................ 137/13 X

*Primary Examiner*—Alan Cohan
*Attorney, Agent, or Firm*—R. S. Sciascia; Q. E. Hodges

[57] ABSTRACT

A method of reducing frictional drag of organic fluids in turbulent flow through conduits by the addition to the fluid of an amount of certain dipole-dipole polymers that are shear stable. More particularly the invention is directed to the addition of the dipole-dipole polymers of pentacoordinate trigonal bipyramid compounds of Group IV metals of the Periodic Table to organic fluids to reduce pumping costs in recirculating systems such hydraulic and lubricating systems and in transportation of such organic fluids in pipe lines.

5 Claims, No Drawings

PROCESS FOR REDUCING FRICTION LOSS IN FLOWING ORGANIC FLUIDS

The invention described herein may be manufactured and used by or for the Government of the United States of America for governmental purposes without the payment of any royalties thereon or therefor.

BACKGROUND OF THE INVENTION

The instant invention relates generally to a method of reducing frictional drag of organic fluids in turbulent flow through conduits and more particularly to the addition of the dipole-dipole polymers of pentacoordinate trigonal bipyramid compounds of Group IV metals of the Periodic Table to organic liquids flowing in a conduit.

It is well known in the art that the frictional drag of viscous organic liquids in turbulent flow through conduits in both recirculating systems, such as for lubricating engines and turbines, and in pipe line transmission systems, contributes greatly to the power requirements and pumping costs of these systems. Frictional losses are apparent from the pressure drop which occurs as the liquid is pumped through the system. An additive which reduces frictional drag and thereby turbulent flow would have great advantages both in efficiency in lubrication systems and in pumping costs.

In the prior art, various additives have been suggested for this purpose; however, they are not a complete solution to the problem. For example, long chain aluminum soaps have been used but they are not stable and quickly deteriorate in oils. Other materials tried, such as polyisobutylene, polyacrylamide, and polysaccaharide derivatives, have not been completely successful because they are not shear stable, must be replaced regularly, and are, therefore, expensive to use. Also, various other means have been tried such as coating the inner walls of the pipes with friction reducing materials, using smooth wall pipes, and increasing the internal diameter. These means of reducing friction have met with little success due to their limited efficacy and relatively high cost.

SUMMARY OF THE INVENTION

Accordingly, an object of the instant invention is to reduce frictional drag of liquids flowing through conduits.

Another object of the present invention is to reduce pumping costs in transporting viscous organic liquids through conduits.

Still another object of the present invention is to increase the efficiency of pumping viscous organic liquids in recirculating systems.

A further object of the instant invention is to provide an inexpensive method of reducing the frictional drag of liquids flowing through pipes.

A still further object of the instant invention is to provide a class of additive materials for use in organic liquids which reduces frictional drag in conduits.

Briefly, these and other objects of the instant invention are attained by the addition of a small amount to organic liquids being transported in a pipe line or flowing in a recirculating system of a dipoledipole polymer of pentacoordinate trigonal bipyramid compounds of the Group IV metals of the Periodic Table.

DESCRIPTION OF THE PREFERRED EMBODIMENT

The materials according to this invention that are useful for frictional drag reduction are dipoledipole polymers of the pentacoordinate trigonal bipyramid compounds of Group IV metals of the Periodic Table, such as tin, titanium, and lead. These compounds consist of three organic moieties and a bridging group such as, but not limited to the halogens, fluorine, chlorine, bromine; as well as perchlorate ($ClO_4$), fluoroborate ($BF_4$), fluoroarsenate ($AsF_6$), fluoroantimonate ($SbF_6$), and nitrogen ring compounds such as imidozole, 1, 2, 4-triazole, benzimidazole and benzotriazole in which one of the nitrogen atoms is attached to the metal atom such as tin, titanium, or lead. The organic moieties are aliphatic and aromatic groups, such as but not limited to, the butyl, phenyl, benzyl, etc. groups. The bridging group, which is attached to one metal atom, also fills the fifth valence of an adjacent metal thus producing a polymeric material of high molecular weight, for example, tri-n-butylstannyl fluoride.

It has been found that these polymers usually maintain their high molecular weight chain structure in a high shear field such as occurs in organic fluids in turbulent flow. However, if the molecular chain is ruptured by an excessive shear field, it recovers its high molecular weight readily after the shear field is relieved. Thus, the efficacy of the additive for frictional drag reduction is restored.

The following example was performed to discover the frictional drag reducing properties of these materials and used apparatus suggested in published references such as: Turbulent Flow Drag Reduction by Dilute Poly (Ethylene Oxide) Solutions in Capillary Tubes, by I. M. Felsen.

EXAMPLE

A capillary tube of 0.04 in dia. by 24 in. long was used with the appropriate closed reservoir, flow meters, and pressure gauge attached as prescribed in the referenced article.

Prior to the flow experiment, a 0.999 gram sample of tri-n-butylstannyl fluoride in powdered form was added to 250 ml. of mixed hexanes. The suspension was stirred and heated to reflux for approximately 24 hours, after which all the solid powder polymer had dissolved. The solution was diluted with the mixed hexanes to 1000 ml., and placed in the sample reservoir of the apparatus described previously.

The solution was forced through the apparatus in turbulent flow at various Reynolds Numbers while flow rates, and total pressure measurements were made. From the flow rate and total pressure measurements, the friction factor and Reynolds numbers were calculated by standard formulas used in conventional hydrodynamic calculations. The drag reduction was calculated from the friction factors, thus $$\% D.R. = \left(1 - \frac{\text{fric. factor (solution)}}{\text{fric. factor (organic liquid)}}\right) 100.$$

After a pass through the apparatus, the fluid was then returned to the sample reservoir and the procedure and measurements were repeated. This procedure was repeated until the fluid has been passed through the capillary twelve times. The reservoir was cleaned of all residual solution material and then refilled with pure hexanes with no drag reducing additive. The procedure and measurements were repeated on the hexanes to obtain control data to compare with that obtained in the test of the hexanes with drag reducing additive, and the results are tabulated below.

| Test No. | Organic Liquid Reynolds No. | Organic Liquid (Only) Friction Factor | Organic Liquid (with Additive) Friction Factor | Drag Reduction (Percent) |
| --- | --- | --- | --- | --- |
| 1st Pass | 12948 | 0.00759 | 0.00161 | 78.8 |
|  | 16772 | 0.00695 | 0.00156 | 77.6 |
| 12th Pass | 12948 | 0.00759 | 0.00173 | 77.2 |
|  | 16772 | 0.00645 | 0.00141 | 79.7 |

As can be seen from the tabulated results, considerable friction drag reduction (approximately 78 percent) is attained when the dipole-dipole polymer has been added to the organic liquid. It can be also noted from this data that the additive polymer remained shear stable as evidenced by the lack of degradation of drag reduction properties during subsequent passes through the apparatus.

Obviously, many modifications and variations of the present invention are possible in light of the above teaching. It is therefore to be understood that within the scope of the appended claims, the invention may be practiced otherwise than as specifically described.

What is claimed is:

1. A method of reducing frictional drag of organic liquids in turbulent flow through conduits comprising:
    adding a quantity of a dipole-dipole polymer, comprising a pentacoordinate trigonal bipyramid compound of group IV metals of the Periodic Table, to the organic liquid.

2. The method of claim 1, wherein said compounds of Group IV metals comprise:
    a bridging group taken from the group consisting of the halogens, perchlorate, fluoroborate, fluoroarsenate, fluoroantimonate, and nitrogen ring compounds such as imidazole, 1, 2, 4-triazole, benzimidazole and benzotriazole in which one of the nitrogen atoms is attached to a metal atom; and
    three organic moieties taken from the group consisting of aliphatic and aromatic groups such as butyl, phenyl, and benzyl.

3. The method of claim 2, wherein said metal atom of the compounds of Group IV metals is tin.

4. The method of claim 2, wherein said metal atom of the Group IV metals is titanium.

5. The method of claim 2, wherein said metal atom of the Group IV metals is lead.

* * * * *